US010619755B2

(12) United States Patent
Carlson et al.

(10) Patent No.: US 10,619,755 B2
(45) Date of Patent: Apr. 14, 2020

(54) SOLENOID OPERATED VALVE WITH FLUX DENSITY CONCENTRATION RING AND MOLDED-IN VALVE SEAT

(71) Applicant: Nextern, Inc., White Bear Lake, MN (US)

(72) Inventors: Casey Carlson, Independence, MN (US); Ryan Douglas, Stillwater, MN (US); Dennis Berke, River Falls, WI (US); Courtland Farrell, Shoreview, MN (US)

(73) Assignee: Nextern, Inc., White Bear Lake, MN (US)

( * ) Notice: Subject to any disclaimer, the term of this patent is extended or adjusted under 35 U.S.C. 154(b) by 181 days.

(21) Appl. No.: 15/873,760

(22) Filed: Jan. 17, 2018

(65) Prior Publication Data
US 2019/0219188 A1 Jul. 18, 2019

(51) Int. Cl.
*F16K 31/06* (2006.01)
*F16K 27/02* (2006.01)
*F16K 1/46* (2006.01)

(52) U.S. Cl.
CPC .......... *F16K 31/0627* (2013.01); *F16K 1/465* (2013.01); *F16K 31/0606* (2013.01); *F16K 31/0651* (2013.01); *F16K 31/0658* (2013.01); *F16K 27/029* (2013.01)

(58) Field of Classification Search
CPC ............... F16K 27/029; F16K 31/0606; F16K 31/0627; H01F 1/0302; H01F 1/0306; H01F 1/22; H01F 3/08; H01F 7/0226; H01F 2007/083; H01F 2007/085; H01F 7/1205; H01F 7/13; H01F 7/1883; H01F 2007/1894

USPC .......................................................... 335/304
See application file for complete search history.

(56) References Cited

U.S. PATENT DOCUMENTS

| 2,614,584 | A | * | 10/1952 | Goepfrich | ........... F16K 31/0606 |
| | | | | | 251/129.21 |
| 3,013,768 | A | * | 12/1961 | La Mastra | .......... F16K 31/0606 |
| | | | | | 251/129.15 |
| 3,232,312 | A | | 2/1966 | Lansky et al. | |
| 3,447,773 | A | | 6/1969 | Huber | |

(Continued)

*Primary Examiner* — Mary E McManmon
*Assistant Examiner* — Richard K. Durden
(74) *Attorney, Agent, or Firm* — Craige Thompson; Thompson Patent Law

(57) ABSTRACT

Apparatus and associated methods relate to a solenoid assisted valve including a split collar and a precision sealing valve seat surface with tight dimensional tolerances and substantial performance repeatability. In an illustrative example, the split collar may concentrically mate around a cylindrical bobbin. In some examples, the split collar may include ferromagnetic material alone or in combination with various thermoplastic materials. The placement of the split collar may be adjusted by manufacturing to fine tune placement of a magnetic pole and to customize valve performance, for example. The valve seat may include, for example, an orifice sealed with an elastic stopper. The valve seat may be configured, for example, with specific ratiometric dimensional relationships and flatness specifications. Various solenoid valves may allow manufacturers to tune the location of a solenoid generated magnetic pole, for example, to tailor the valve plunger performance for a wide variety of applications.

20 Claims, 11 Drawing Sheets

(56) References Cited

U.S. PATENT DOCUMENTS

| | | | |
|---|---|---|---|
| 3,593,241 A | | 7/1971 | Ludwig |
| 3,784,945 A | * | 1/1974 | Baermann .......... F16C 32/0427 |
| | | | 335/302 |
| 3,855,691 A | * | 12/1974 | Deschamps .......... C04B 35/265 |
| | | | 29/608 |
| 3,860,894 A | * | 1/1975 | Popovic .................. H01F 7/13 |
| | | | 335/258 |
| 3,967,808 A | * | 7/1976 | Lieding .................... F16K 1/34 |
| | | | 251/46 |
| 4,076,212 A | | 2/1978 | Leman |
| 4,166,991 A | * | 9/1979 | Haner ...................... H01F 7/13 |
| | | | 335/255 |
| 4,501,299 A | | 2/1985 | Klimowicz et al. |
| 4,596,271 A | | 6/1986 | Brundage |
| 5,047,743 A | * | 9/1991 | Scesney .................. H01F 3/10 |
| | | | 29/607 |
| 5,049,053 A | * | 9/1991 | Tabaru .................... H01F 7/021 |
| | | | 249/134 |
| 5,154,394 A | | 10/1992 | DuHack |
| 5,174,336 A | * | 12/1992 | Casey ...................... B60T 8/363 |
| | | | 137/550 |
| 5,218,999 A | | 6/1993 | Tanimoto |
| 5,771,884 A | | 6/1998 | Yarnall et al. |
| 6,405,757 B1 | * | 6/2002 | Jabcon ................ F16K 31/0606 |
| | | | 137/625.65 |
| 6,537,505 B1 | | 3/2003 | LaBudde et al. |
| 2002/0020442 A1 | | 2/2002 | Najmolhoda et al. |
| 2009/0039302 A1 | * | 2/2009 | Giacomini .......... F16K 31/0606 |
| | | | 251/129.15 |
| 2012/0168655 A1 | * | 7/2012 | Chuang .................... F16K 1/38 |
| | | | 251/129.15 |

\* cited by examiner

SOLENOID OPERATED VALVE WITH FLUX DENSITY CONCENTRATION RING AND MOLDED-IN VALVE SEAT

TECHNICAL FIELD

Various embodiments relate generally to solenoid operated valves.

BACKGROUND

Fluids may be used for various processes. For example, pressurized air may actuate valves without the use of electrical energy. Pressurized liquids may clean cars, dishes and walls, for example. Industries may manufacture various gases and liquids as a final product. During the manufacturing process the gases and liquids may be transferred thorough pipelines, the flow being controlled by various valves. In some instances, the valves may be controlled by solenoids.

Fluid flow may be controlled in an on/off fashion in a two-way valve. In some instances, fluid flow may be switched from an inlet port to one of two outlet ports in a three-way valve. Further, in some instances, fluid flow may be switched from an inlet port to one of three or more outlet ports in a multi-port valve.

SUMMARY

Apparatus and associated methods relate to a solenoid assisted valve including a split collar and a precision sealing valve seat surface with tight dimensional tolerances and substantial performance repeatability. In an illustrative example, the split collar may concentrically mate around a cylindrical bobbin. In some examples, the split collar may include ferromagnetic material alone or in combination with various thermoplastic materials. The placement of the split collar may be adjusted by manufacturing to fine tune placement of a magnetic pole and to customize valve performance, for example. The valve seat may include, for example, an orifice sealed with an elastic stopper. The valve seat may be configured, for example, with specific ratiometric dimensional relationships and flatness specifications. Various solenoid valves may allow manufacturers to tune the location of a solenoid generated magnetic pole, for example, to tailor the valve plunger performance for a wide variety of applications.

Various embodiments may achieve one or more advantages. For example, some embodiments may include a precision machined valve seat held to substantially tight tolerances for flatness and smoothness. The precision machined valve seat in combination with an elastic stopper may mitigate leakage to closed ports. In some examples, the precision machined valve seat may allow the solenoid valve to control fluid flow at higher pressure. In some examples, the precision machined valve seat may seal at lower plunger force which may advantageously mitigate over-design of solenoid driver circuits. More efficient plunger transitions may advantageously reduce power consumption.

In some production assembly procedures, trimming the placement of the split collar without reworking the solenoid coils may mitigate micro-damage to the thin insulation coating on the coils, which may avoid, for example, damage due to self-heating of the coils. Some embodiments may reduce production scrap rates. Various implementations may reduce actuation power and/or associated acoustical noise by precisely adjusting a location of a generated magnetic field. In some implementations, improved plunger profiles may exhibit improved initial acceleration upon energizing the coils. Tailored acceleration profiles may more accurately control plunger motion so as to, for example, reduce transition time and/or settling time, with a reduced impact force of the plunger against the seal.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 6:
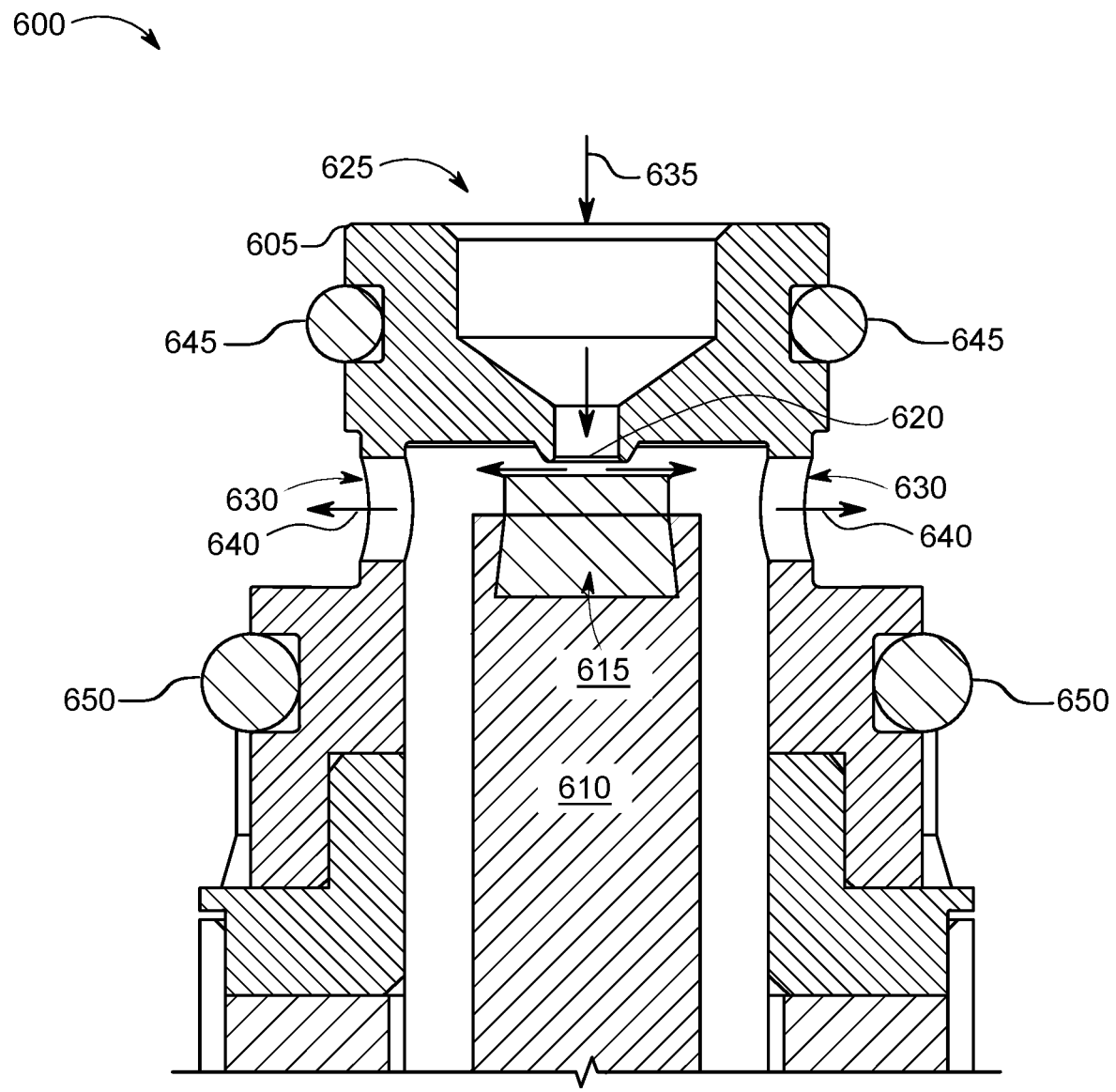
FIG. 6 depicts a cut-away view of an exemplary solenoid valve in an active state with a precision valve seat illustrating fluid flow at a distal end of a plunger.
Figure 7:
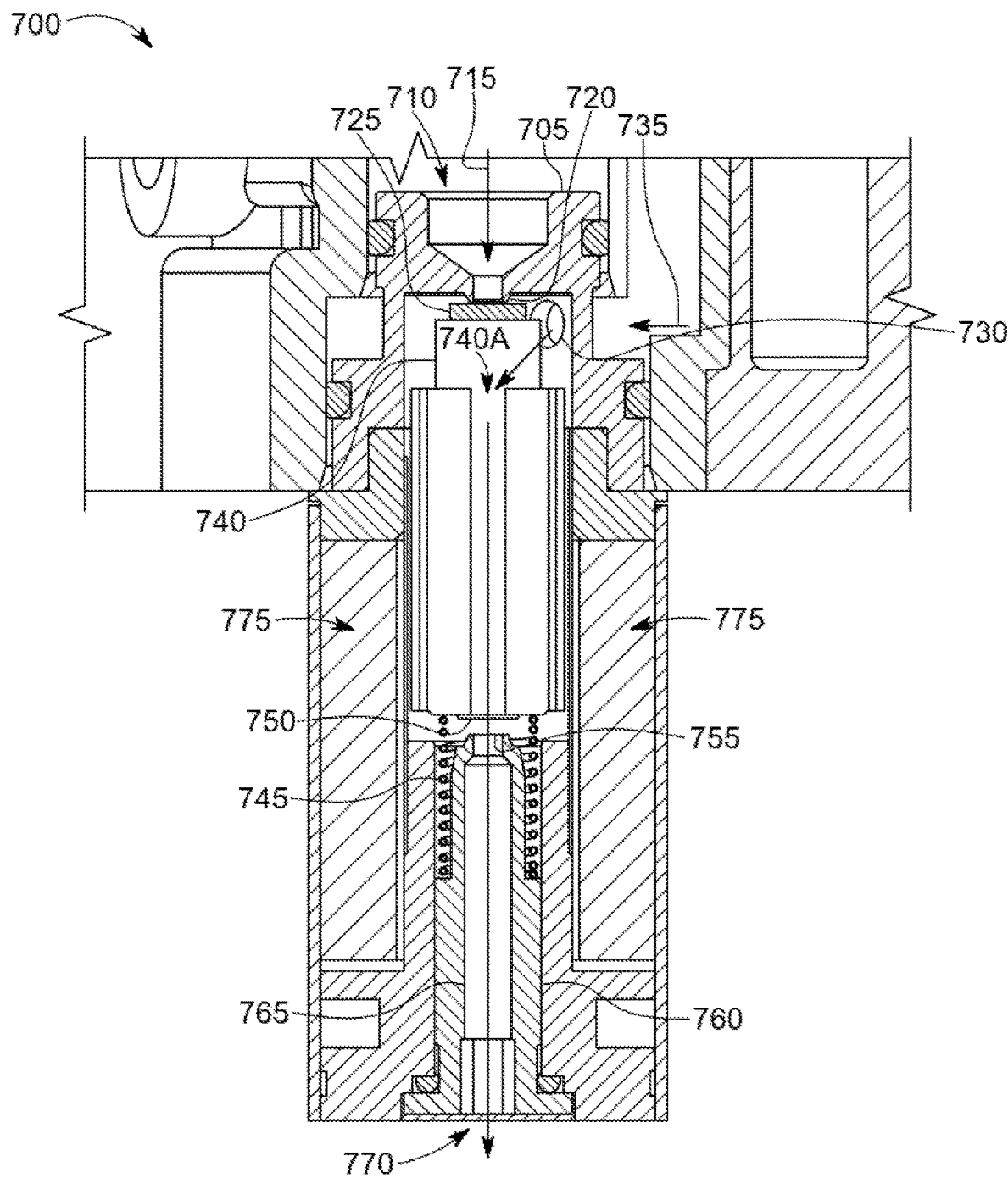
FIG. 7 depicts a cross-sectional view of an exemplary three-way solenoid valve in a non-active state illustrating fluid flow from a side port to a bottom port.
Figure 8:
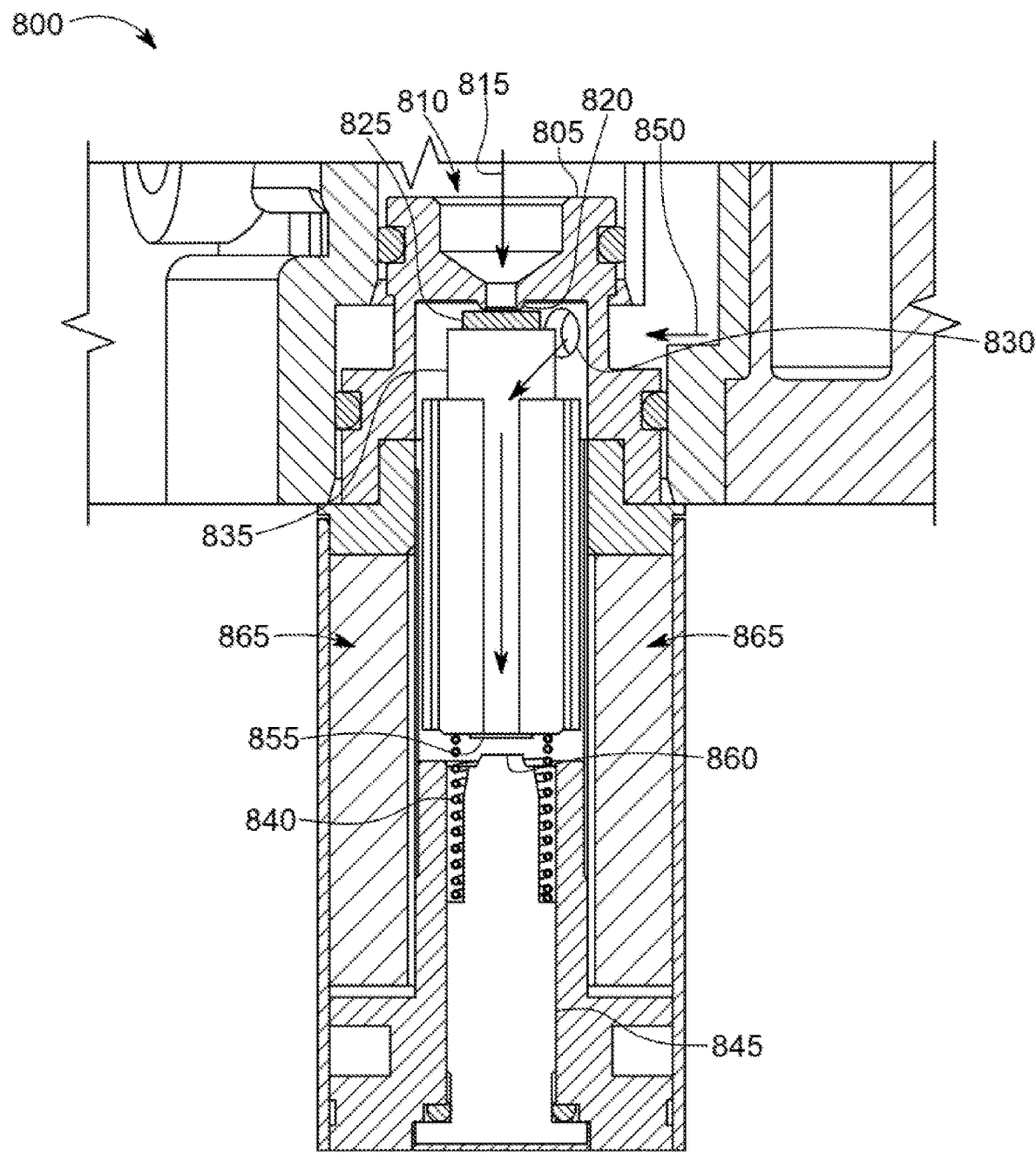
FIG. 8 depicts a cross-sectional view of an exemplary two-way solenoid valve.
Figure 9:
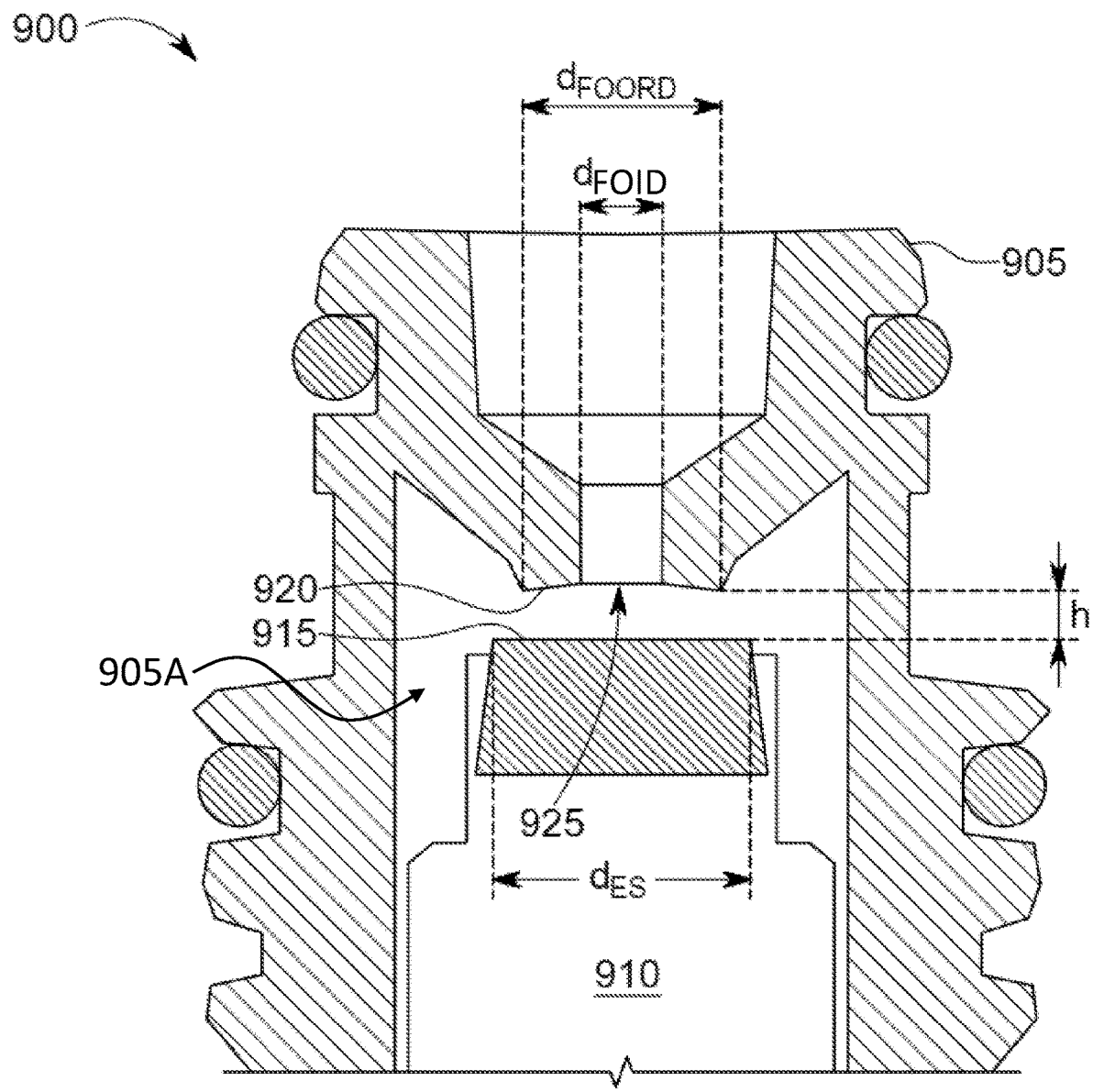
FIG. 9 depicts a cross-sectional view of an exemplary solenoid valve illustrating ratiometric relationships of various dimensions.
Figure 10:
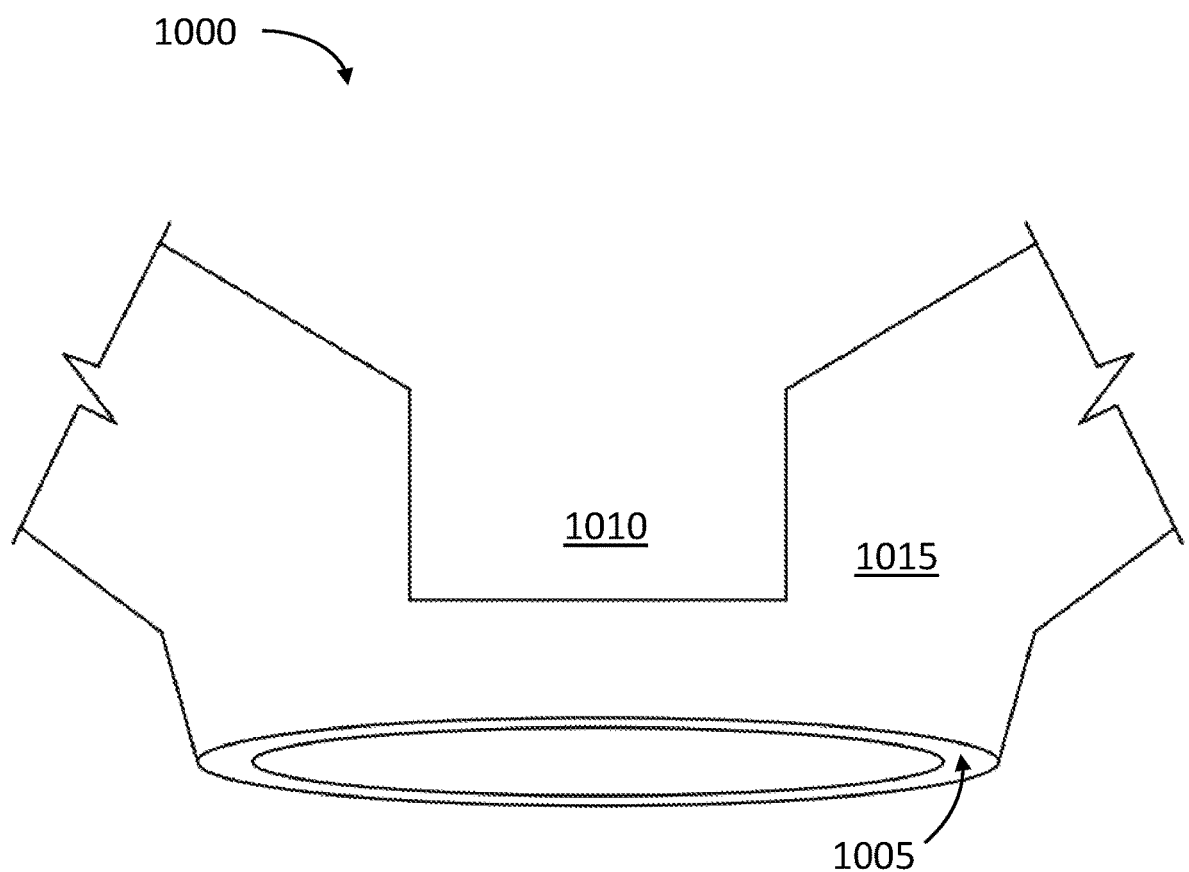
FIG. 10 depicts a perspective tear-away view of an exemplary solenoid valve illustrating the flatness of a valve seat.

To aid understanding, this document is organized as follows. First, a use case scenario is briefly introduced with reference to FIG. 1. Second, with reference to FIGS. 2 and 3, exemplary embodiments that illustrate an exploded view and an assembled cross-sectional view of a solenoid assisted valve assembly are described. Next, with reference to FIGS. 4 and 5, the discussion turns to exemplary embodiments that illustrate the axial alignment/positioning/targeting of a magnetic pole via a magnetically permeable split collar. With reference to FIGS. 6, 7 and 8, exemplary embodiments illustrating fluid flow in two-way and three-way valve assemblies are presented. FIGS. 9 and 10 illustrate dimensional details of structural relationships within an exemplary solenoid valve to explain improvements in valve seating and sealing. Finally, with reference to FIG. 11, details of an exemplary molded-in valve seat are presented.

For purposes of this document, unless stated otherwise, the term "magnetically permeable" may be interpreted as having substantially high relative magnetic permeability.

Materials with relative magnetic permeabilities of greater than about 10 may be considered to have substantially high relative magnetic permeability. Further, purposes of this document, unless stated otherwise, the term "permeability" may be interpreted as being magnetic permeability.

Figure 1:
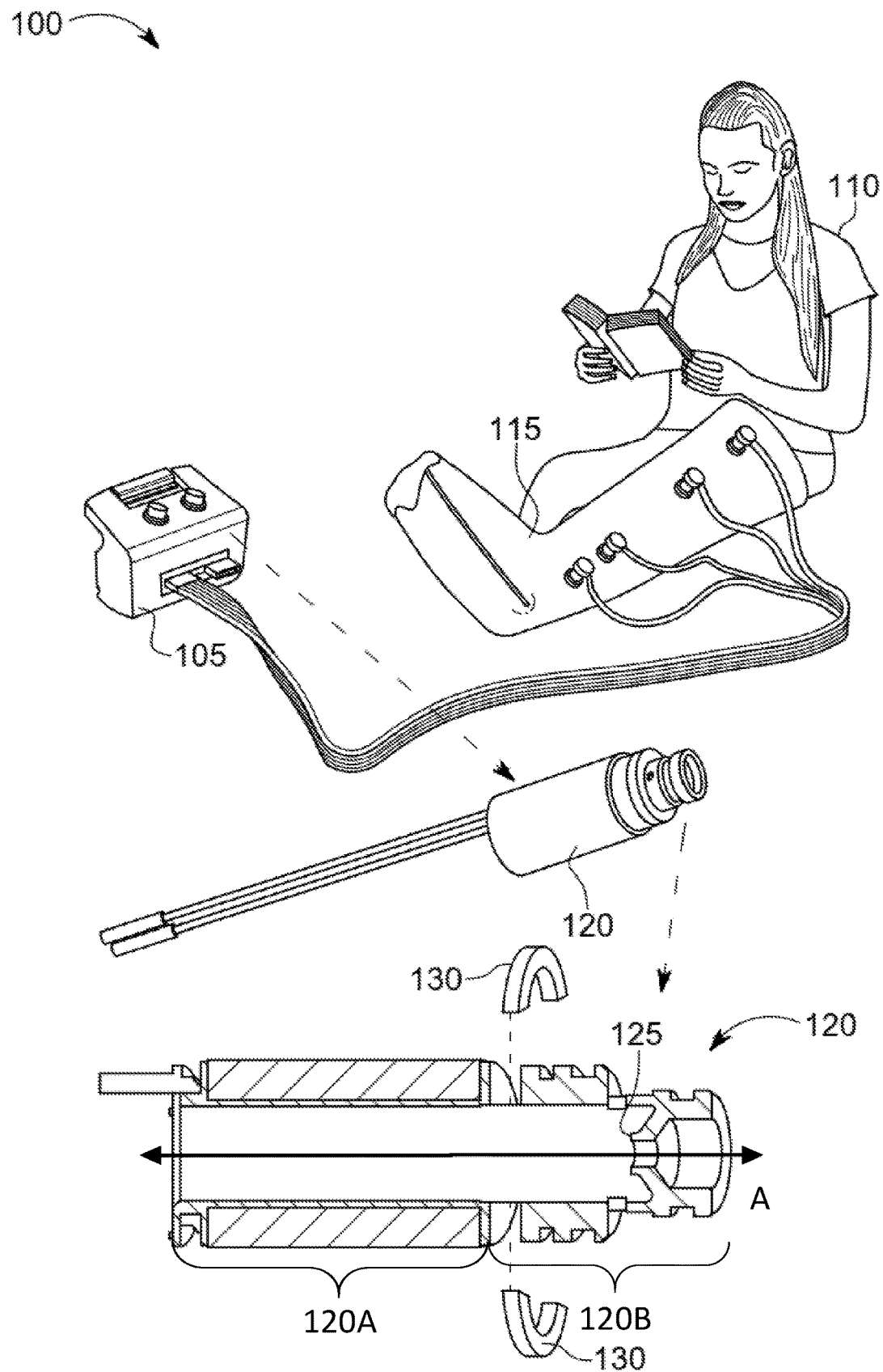
FIG. 1 depicts an exemplary solenoid valve gating fluid flow in a therapeutic chambered stocking.

FIG. 1 depicts an exemplary solenoid valve gating air flow in a therapeutic chambered stocking. A use case scenario 100 includes a vascular therapy device 105 providing therapy to a patient 110. A therapeutic stocking 115 is applied to the leg of the patient 110. In the depicted example, the vascular therapy device 105 includes a solenoid valve 120 operable to control communication of airflow between the vascular therapy device 105 and the therapeutic stocking 115. The solenoid valve 120 includes a valve seat 125. The valve seat 125 may provide a high level of tolerance and repeatability. Designers of medical equipment, for example, may find benefit in the high level of tolerance and repeatability of the solenoid valve 120, which may provide the designers with precise control of pressure and flow of various fluids (e.g., air, liquids). In some examples, the valve seat 125 may be a precision valve sealing surface.

The solenoid valve 120 includes a magnetically permeable split collar 130. The magnetically permeable split collar 130 facilitates reinforcement of a magnetic field generated within the solenoid valve 120. The magnetically permeable split collar 130 may focus and/or concentrate the magnetic field generated within the solenoid valve 120. Magnetic field reinforcement may provide higher plunger force within the solenoid valve 120. Higher plunger forces in the solenoid 120 may advantageously mitigate valve leakage, thereby increasing valve accuracy. Higher plunger forces may provide shorter delay time between valve actuation and plunger engagement. Shorter delays may provide more accurate timing for valve on-time and valve off-time.

The therapeutic stocking 115 applied to the leg of the patient 110 may advantageously force blood within the leg of the patient 110 into therapeutic circulation. The solenoid valve 120 within the vascular therapy device 105 selectively directs fluid flow into one or more chambers within the therapeutic stocking 115. The solenoid valve 120 may be a three-way valve, which may be controlled to direct air pressure from a compressor within the vascular therapy device 105 to the chambers within the therapeutic stocking 115. In some examples, the solenoid valve 120 may be controlled to direct air pressure from the chambers within the therapeutic stocking 115 to ambient air, venting the chambers within the therapeutic stocking 115. In some implementations, the solenoid valve 120 may be a two-way valve, for example.

Figure 2:
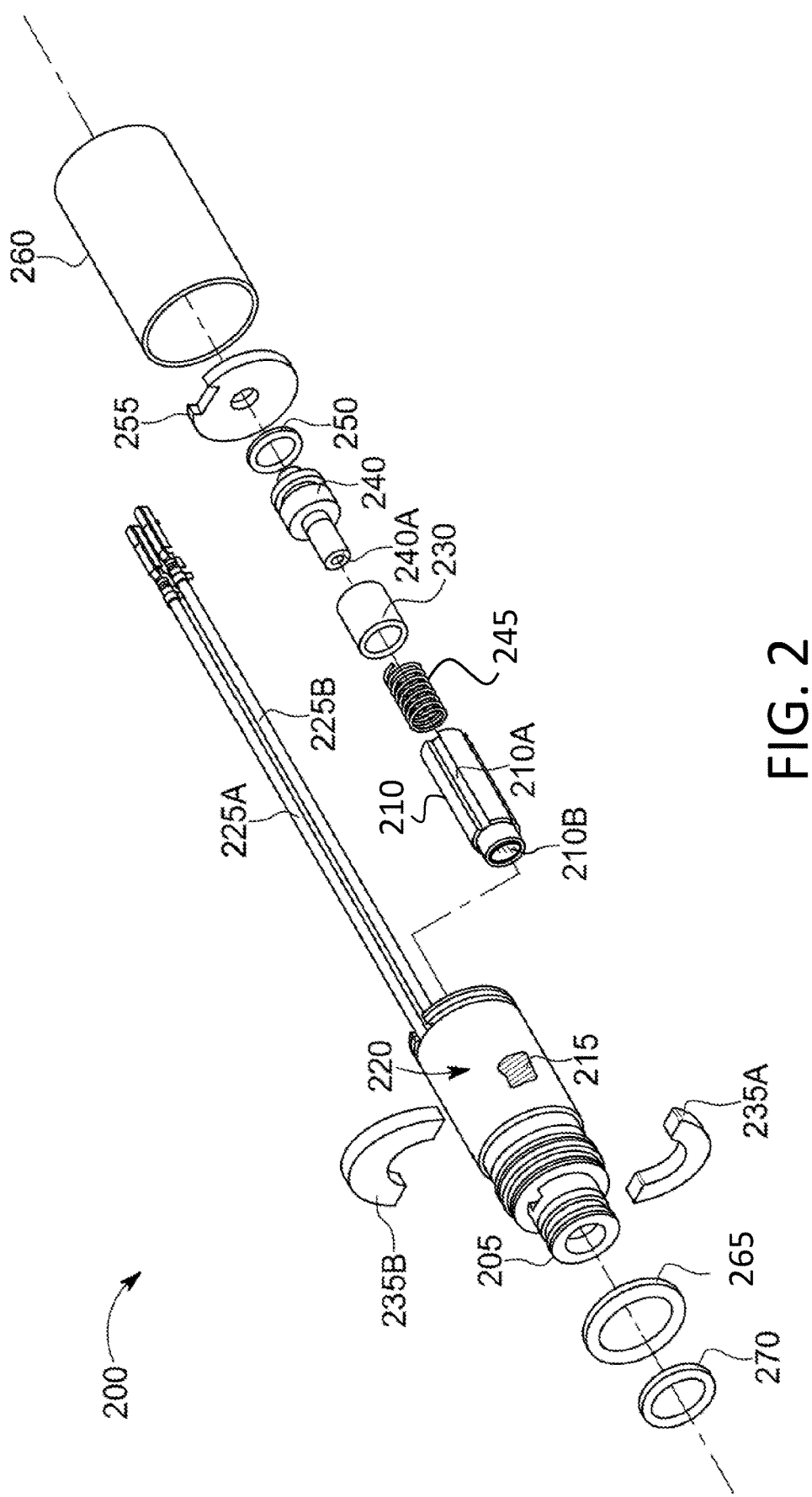
FIG. 2 depicts an exploded perspective view of an exemplary solenoid valve system.

FIG. 2 depicts an exploded perspective view of an exemplary solenoid valve system. In the depicted example, a solenoid valve system 200 includes a bobbin 205. The bobbin 205 provides the structure onto which the components reside. A plunger 210 is disposed within an inner chamber of the bobbin 205. The plunger 210 includes one or more integrated channels 210A. The channels 210A may channel air from a distal end of the plunger 210 to a proximal end of the plunger 210. The plunger 210 is fixedly coupled to a distal elastic stopper 210B. In some examples, the plunger 210 may be releasably coupled with the distal elastic stopper 210B. The plunger 210 is fixedly coupled to a proximal elastic stopper (depicted in FIG. 3, item 310A). In some examples, the plunger 210 may be releasably coupled to the proximal elastic stopper. The plunger 210 is actuated within the bobbin 205 by excitation of a solenoid winding 215, which is wrapped around the bobbin in a multi-turn configuration. The solenoid winding 215 is covered by one or more layers of tape 220. The tape 220 may include, by way of example and not limitation, polyimide film, fiberglass, polyester, fluoropolymer and/or impregnated cloth. In some implementations, the tape 220 may be supplemented or replace by insulative film coating on the wire of the solenoid winding 215 (e.g., magnet wire). The tape 220 may advantageously provide substantially high dielectric breakdown strength in a substantially thin sheet. In various examples, the tape 220 may include one or more polyimide films. Polyimide films may include thin flexible sheets with high electrical insulation properties and high heat resistance.

The solenoid winding 215 may produce a magnetic field intensity when electrical power is applied to activation leads 225A and 225B. The magnetic field intensity is proportional to the number of turns on the solenoid winding 215 and the electrical current flowing in the solenoid windings 215. The electrical current flowing in the solenoid windings 215 may be the electrical current flowing in the activation leads 225A and 225B. The magnetic field intensity produces a magnetic flux. The density of the magnetic flux may be increased by the introduction of a substantially high magnetic permeability material within the magnetic flux path. Further, a magnetically permeable ring 230 is disposed within the inner chamber of the bobbin 205. The magnetically permeable ring 230 includes a material with substantially high permeability. The magnetically permeable ring 230 provides a low reluctance path for magnetic flux when the solenoid winding 215 is activated.

The solenoid valve system 200 includes a magnetically permeable split collar including a first magnetically permeable split collar half 235A and a second magnetically permeable split collar half 235B. In various embodiments, the magnetically permeable split collar may include one or more ferromagnetic materials. The magnetically permeable split collar may advantageously provide a straight forward assembly method. In some embodiments, the first magnetically permeable split collar half 235A and the second magnetically permeable split collar half 235B, may exist as a unitary collar component. The unitary collar component may advantageously reduce the bill of materials parts count of the solenoid valve system 200. In some examples, the unitary ring component may be molded onto the bobbin 205. A proximal fitting 240 is disposed within the inner chamber of the bobbin 205. The proximal fitting 240 includes a proximal valve seat 240A. The proximal valve seat 240A may be precision manufactured. The precision manufactured proximal valve seat 240A may provide substantial precision sealing to a proximal elastic stopper (depicted in FIG. 3, item 310A). The precision manufactured valve seat 240A may provide a substantially high level of tolerance and repeatability.

A spring 245 is captured between the proximal fitting 240 and the plunger 210. The proximal fitting 240 is elastically engaged with a proximal O-ring 250. A back cover 255 is proximate the bobbin 205 at a proximal end. An outer sleeve 260 encloses the bobbin 205, the back cover 255, first magnetically permeable split collar half 235A and the second magnetically permeable split collar half 235B. The distal end of the bobbin 205 is elastically engaged with a large distal O-ring 265 and a small distal O-ring 270.

The solenoid valve system 200 with the magnetically permeable split collar that includes the first magnetically permeable split collar half 235A and the second magnetically permeable split collar half 235B may provide substantially high pull-force on the plunger 210. The magnetically permeable split collar may be shimmed within a mating groove on the bobbin 205 to provide a customized actuation force on the plunger 210. In some embodiments, the magnetically permeable split collar including the first magnetically permeable split collar half 235A and the second magnetically permeable split collar half 235B may include a permeability gradient customized to provide a tailored pull-force profile over the travel extent of the plunger 210.

Figure 3:
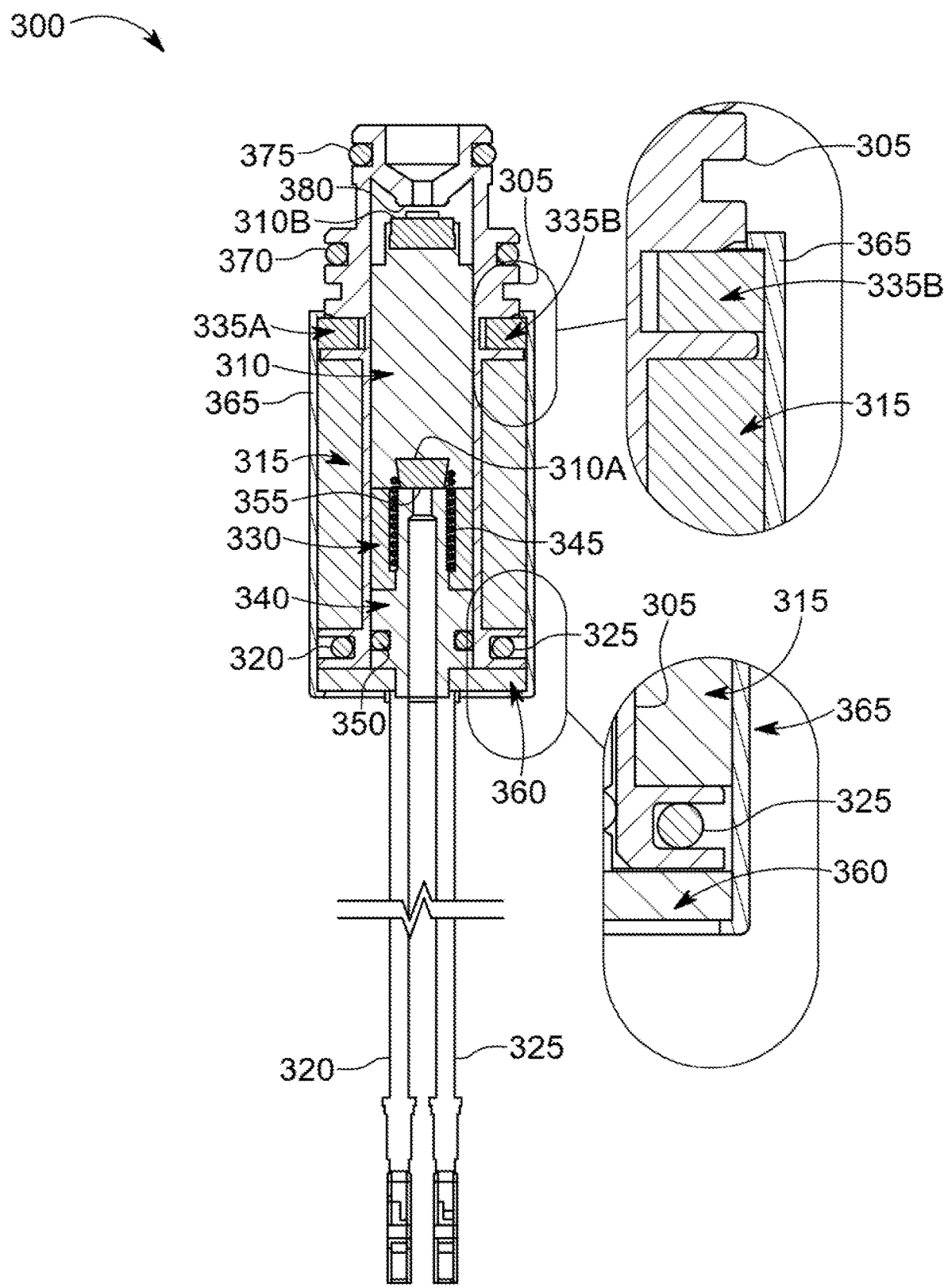
FIG. 3 depicts an assembled cross-sectional view of an exemplary solenoid valve system.

FIG. 3 depicts an assembled cross-sectional view of an exemplary solenoid valve system. In the depicted example, a solenoid valve system 300 includes a bobbin 305. The bobbin 305 provides the structure onto which the components reside. A plunger 310 is disposed within an inner chamber of the bobbin 305. The plunger 310 is fixedly coupled to a proximal elastic stopper 310A and a distal elastic stopper 310B. The plunger 310 is actuated within the bobbin 305 by excitation of a solenoid winding 315. Actuation may define a powered state.

The solenoid winding 315 may produce a magnetic field intensity when electrical power is applied to activation leads 320 and 325. The magnetic field intensity is proportional to the number of turns on the solenoid winding 315 and the electrical current flowing in the solenoid windings 315. The magnetic field intensity produces a magnetic flux. A density of the magnetic flux (magnetic flux density) may be increased by the introduction of a substantially high magnetic permeability material within the magnetic field intensity. Further, a magnetically permeable ring 330 is disposed within the inner chamber of the bobbin 305. The magnetically permeable ring 330 may include a substantially high magnetic permeability material. The magnetically permeable ring 330 produces a high magnetic flux density when the solenoid winding 315 is activated. In various examples, the magnetically permeable ring 330 may include one or more ferromagnetic materials.

The solenoid valve system 300 includes a magnetically permeable split collar including a first magnetically permeable split collar half 335A and a second magnetically permeable split collar half 335B. The solenoid valve system 300 including the first magnetically permeable split collar half 335A and the second magnetically permeable split collar half 335B may be within a high magnetic flux density path. The first magnetically permeable split collar half 335A and the second magnetically permeable split collar half 335B may provide substantially high pull-force on the plunger 310. The magnetically permeable split collar may be shimmed within a mating groove on the bobbin 305 to provide a customized actuation force on the plunger 310. In some embodiments, the magnetically permeable split collar may include a permeability gradient customized to provide a pull-force gradient over the travel extent of the plunger 310. The first magnetically permeable split collar half 335A and the second magnetically permeable split collar half 335B are configured to optimize magnetic flux density at the proximal end of the plunger 310 to maximize pull-force when the solenoid is in a powered state.

A proximal valve fitting 340 is disposed within the inner chamber of the bobbin 305. A spring 345 is captured between the plunger 310 and the proximal valve fitting 340. The proximal valve fitting 340 is elastically engaged with a proximal O-ring 350. The proximal valve fitting 340 includes a proximal valve seat 355. The bobbin 305 is proximate a back cover 360. An outer sleeve 365 encloses the bobbin 305. The distal end of the bobbin 305 elastically engages a large distal O-ring 370 and a small distal O-ring 375.

In the depicted example, when the solenoid winding 315 is activated, the plunger 310 is configured to move in the downward direction (with respect to the orientation in FIG. 3) by the magnetic flux created by the solenoid winding 315. When the solenoid winding 315 is not activated, the plunger 310 is forced to move in the upward direction (with respect to the orientation in FIG. 3) by the spring 345.

The proximal elastic stopper 310A may be configured to seal against the proximal valve seat 355 when the solenoid valve system 300 is in the actuated state. In the actuated state, the magnetic flux density (created by the solenoid windings 315 in combination with the magnetically permeable ring 330, the first magnetically permeable split collar half 335A and the second magnetically permeable split collar half 335B) pulls the plunger 310 with the proximal elastic stopper 310A onto the proximal valve seat 355.

The distal elastic stopper 310B is configured to seal against a distal valve seat 380 when the solenoid valve system 300 is in the non-actuated state. In the non-actuated state, the spring 345 pushes the plunger 310 with the distal elastic stopper 310B onto the distal valve seat 380.

In some examples, the spring constant of spring 345 may be about 5, 6, 7, 8, 9, 10, 11, 12, 13, 14, 15, 16, 17, 18, 19, 20, 21, 22, 23, 24 or about 25 gf/mm or more. The spring 345 may push the plunger 310 onto the distal valve seat 380 with a force of about 50 gf. In some examples, the spring 345 may push the plunger 310 onto the distal valve seat 380 with a force of about 25, 30, 35, 40, 45, 50, 55, 60, 65, 70 or about 75 gf or more.

In an illustrative example, the spring 345 may have an uncompressed length of about 9.5 mm. The spring 345 may be compressed to a length of about 6.1 mm. The compression displacement may be about 3.4 mm. Accordingly, the force in the spring 345 may be about 0.51 N.

In an illustrative example, the spring 345 may have an uncompressed length of about 11.0 mm. The spring 345 may be compressed to a length of about 6.8 mm. The compression displacement may be about 4.2 mm. Accordingly, the force in the spring 345 may be about 0.50 N.

Figure 4:
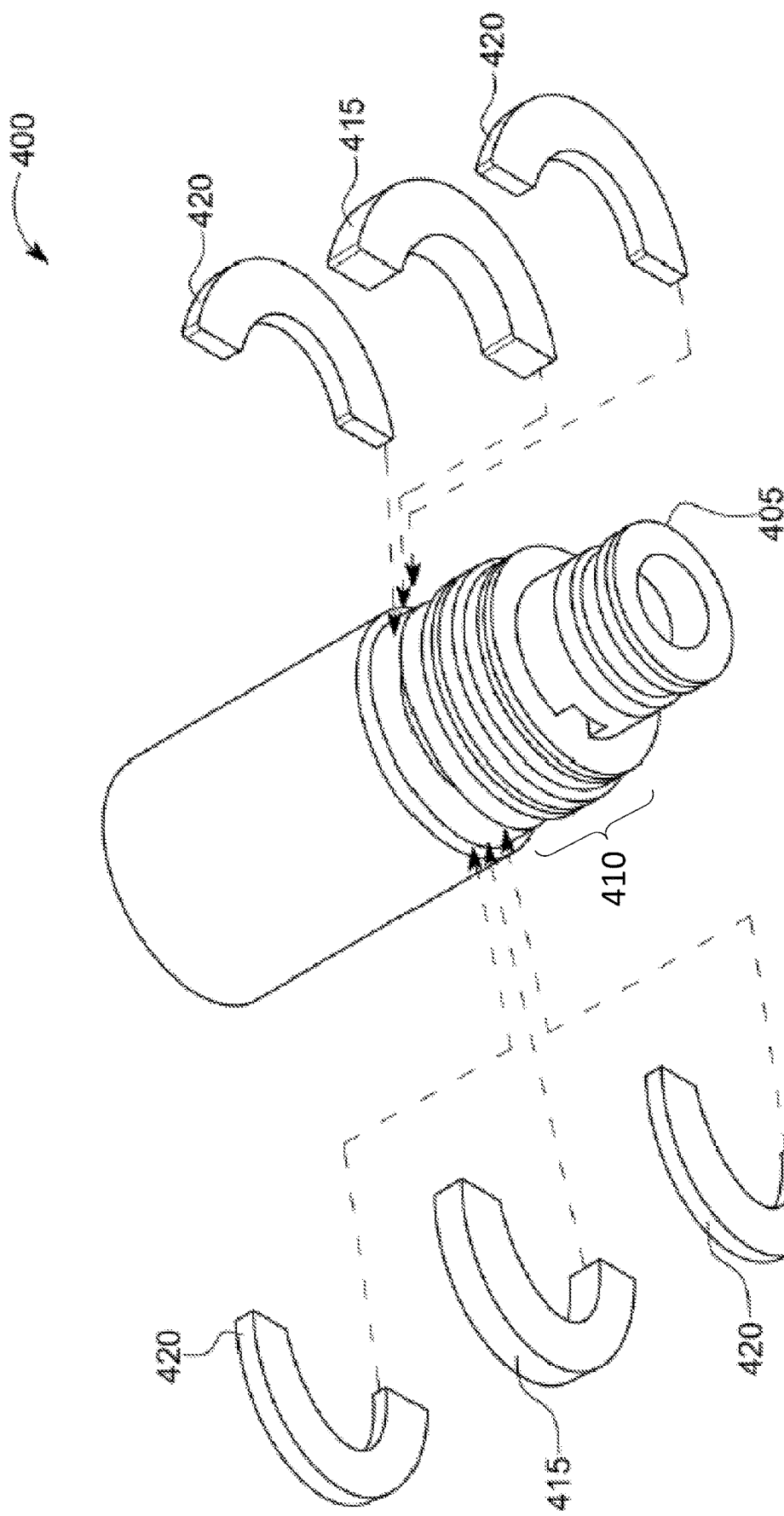
FIG. 4 depicts a perspective view of an exemplary split collar illustrating various thicknesses, assembly sites and companion shims to precisely place magnetic flux density by adjustment of the split collar.

FIG. 4 depicts a perspective view of an exemplary split collar illustrating various thicknesses, assembly sites and companion shims to precisely place magnetic flux density by adjustment of the split collar. A solenoid valve system 400 includes a bobbin 405. The bobbin 405 includes one or more grooves 410. The grooves 410 receive a split collar 415. The split collar 415 may be operable to increase a flux density on the distal end of the solenoid valve system 400. The flux density may be precisely focused by adjusting the position of the split collar 415 with respect to its axial displacement within one or more of the grooves 410.

In the depicted example, one or more shims 420 are proximate the split collar 415. In some examples, the one or more shims 420 may be placed on opposing sides of the split collar 415. In some examples, the one or more shims 420 may be placed on the same side of the split collar 415. Accordingly, placement of the shims 420 may precisely adjust the axial placement of the split collar 415. Further, adjusting the axial placement of the split collar 415 may focus flux density in a substantially precise manner. The flux density focus adjustment may tune the performance of an internal plunger, such as the plunger 210 in FIG. 2. In some implementations, the position of the split collar 415 may be tuned for maximum plunger force. Maximum plunger force may mitigate leakage between an elastic plunger stopper and a valve seat. In some implementations, the position of the split collar 415 may be tuned for less plunger force, for example, to trade off fluid pressure capacity with valve noise. In some embodiments, less plunger force may positively affect valve lifespan. For example, less force of an elastic plunger stopper against a valve seat may subject the elastic plunger stopper to less physical abuse, reducing wear-out and increasing valve life.

Some flux density adjustment embodiments may include various thicknesses of the split collars 415. For example, thicker split collars 415 may advantageously focus the flux density over a longer travel extent of the plunger. In some examples, thinner split collars 415 may advantageously focus the flux density on a smaller more directed area. Thinner split collars 415 may provide more adjustment room for the split collar 415 within the mating groove(s) 410.

Figure 5:
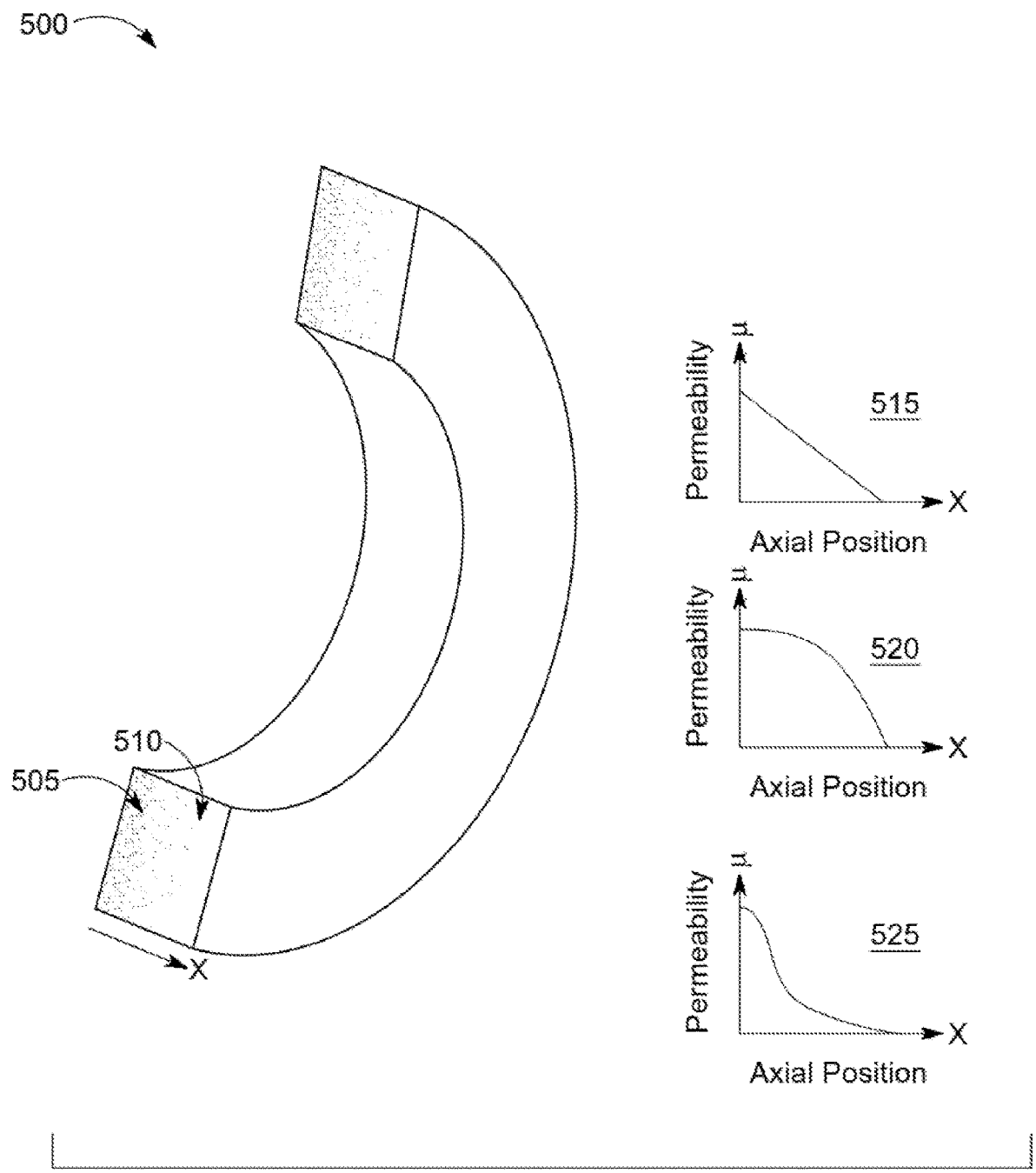
FIG. 5 depicts a perspective view of an exemplary split collar illustrating permeability tailoring to suit specific applications.

FIG. 5 depicts a perspective view of an exemplary split collar illustrating permeability tailoring to suit specific applications. An exemplary split collar 500 includes a substantially high permeability magnetic material 505. In the depicted example, the high permeability magnetic material 505 is included within substantially low permeability material 510. The term "substantially high permeability" may be defined as having a relative permeability of greater than or equal to 15. The term "substantially low permeability" may be defined as having a relative permeability of less than 2.

The split collar 500 has been designed and manufactured to produce a permeability gradient. The permeability gradient may be linear 515. In some embodiments, the permeability gradient may be nonlinear 520, for example, the permeability may remain substantially high for some portion of linear displacement, depicted as X in the example in FIG. 5. In some examples of nonlinear gradients 525, the permeability may drop significantly for some portion of linear displacement, then be asymptotic for the remainder of its length.

Various examples of permeability gradients may control a magnetic force to tailor a plunger force profile. For example, the force may be strong initially, then may taper as the plunger travels toward a valve seat. Such force profiles may move the plunger quickly, yet mitigate audible noise from plunger impacts onto the valve seat, for example. The force may be tailored by adjusting the material permeability of the split collar. The force may be tailored by adjusting the placement of the split collar on the solenoid valve system.

FIG. 6 depicts a cut-away view of an exemplary solenoid valve with a precision valve seat in an active state illustrating fluid flow at a distal end of a plunger. A solenoid valve 600 includes a valve body 605. A plunger 610 is disposed within the inner chamber of the valve body 605. When the solenoid valve 600 is activated, the plunger 610 and an associated distal elastic stopper 615 is pulled away from a precision valve seat 620. Further, when the plunger 610 is activated, fluid may be allowed to flow from a distal orifice 625 to one or more side ports 630. An inlet fluid flow 635 may be isolated from an outlet fluid flow 640 by a small O-ring 645. The outlet fluid flow 640 may be isolated from the ambient environment by a large O-ring 650.

FIG. 7 depicts a cross-sectional view of an exemplary three-way solenoid valve in a non-activate state illustrating fluid flow from a side port to a bottom port. A solenoid valve 700 includes a valve body 705. The valve body 705 includes a top orifice 710. In the depicted example, the solenoid valve 700 is not activated, therefore, a blocked distal valve seat 720 mitigates fluid flow 715 from entering the top orifice 710. The distal valve seat 720 is blocked by a top elastic stopper 725. The valve body 705 includes a side port 730. The side port 730 allows a fluid flow 735 to enter the valve body 705 from the side. Since fluid flow is blocked from entering the top orifice 710 by the blocked distal valve seat 720, fluid flow continues through surface channels of a plunger 740. The plunger 740 in this illustrative example is not depicted in cross-sectional view, in order to show the plunger 740 surface features. The fluid flow 735 continues through a surface channel 740A. The fluid flow 735 exits the surface channel 740A at a proximal end of the plunger 740. Since the plunger 740 is in the non-activated state, a spring 745 holds the plunger 740 and a bottom elastic stopper 750 off a proximal valve seat 755. Fluid flow 735 continues into a bottom valve fitting 760. The bottom valve fitting 760 includes an elongated bottom orifice 765. Fluid flow 735 continues through the elongated bottom orifice 765 finally exiting a bottom orifice 770.

When a solenoid coil 775 activates, the plunger 740 moves downward blocking the proximal valve seat 755, and opening the distal valve seat 720. Accordingly, fluid flow may move between the top orifice 710 and the side port 730. This action is shown in more detail in FIG. 6.

In various examples, the fluid flow may be any fluid material (e.g., air, gas, liquid, fluid-like solids). Further, fluid flow direction may be as depicted in FIG. 7 or may be in a reverse direction, for example.

FIG. 8 depicts a cross-sectional view of an exemplary two-way solenoid valve. A solenoid valve 800 includes a valve body 805. The valve body 805 includes a top orifice 810. In the depicted example, the solenoid valve 800 is not activated, therefore, fluid flow 815 entering the top orifice 810 is blocked. The fluid flow 815 is blocked due to a blocked distal valve seat 820. The distal valve seat 820 is blocked by a top elastic stopper 825.

The valve body 805 includes a side port 830. A plunger 835 is disposed within the inner chamber of the valve body 805. In the non-activated state, the plunger 835 is forced upward (with reference to FIG. 8) by a spring 840. The spring 840 is captured between the plunger 835 and a proximal fitting 845.

Referring to FIG. 7, the 3-way valve allows fluid flow 735 in the non-activated state to flow from the side port 730 through the plunger 740 for an eventual exit from the bottom orifice 770. In the depicted example of FIG. 8, a fluid flow 850 enters the side port 830. As the fluid flow 850 travels down the plunger 835, it is blocked from entering the proximal fitting 845, since it is solid (e.g., without a fluid channel).

The plunger 835 is fixedly coupled to a bottom elastic stopper 855. Further, the solid proximal fitting 845 blocks the fluid flow 850, even though the spring 840 holds the plunger 835 and the bottom elastic stopper 855 off a proximal valve seat 860. In some examples, the solid proximal fitting 845 may not include the proximal valve seat 860. In place of the proximal valve seat 860, a flat surface may be provided as a stop for the plunger 835.

When a solenoid coil 865 activates, the plunger 835 moves downward opening the distal valve seat 820. Accordingly, fluid flow 815 may move between the top orifice 810 and the side port 830. This action is shown in more detail in FIG. 6.

FIG. 9 depicts a cross-sectional view of an exemplary solenoid valve illustrating ratiometric relationships of various dimensions. A top cross section of an exemplary solenoid valve 900 includes a valve body 905. The valve body 905 includes an elongated aperture 905A. a plunger 910 is disposed within the elongated aperture 905A. The plunger 910 is fixedly coupled to an elastic stopper 915. The elastic stopper 915 includes a diameter defined as $d_{ES}$.

The valve body 905 includes a valve seat 920. In some embodiments, the valve seat 920 may include metal. The valve seat 920 may be molded into the valve body 905. In some examples, the valve seat 920 may be unitary with the valve body 905. The valve seat 920 includes a front orifice 925. The front orifice 925 includes an inner diameter defined as $d_{FOID}$. The front orifice 925 includes an outer rim diameter defined as $d_{FOORD}$.

In the depicted example, Ratio1 may be defined as:

$$\text{Ratio1} = d_{ES} : d_{FOID}$$

Ratio1 may be about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2 or about 3.3 or more. In an illustrative example, the rubber sealing surface, such as elastic stopper 915, may have a diameter of 4.0 mm. A metal valve seat, that the elastic stopper 915 seals against, may have a front orifice inner diameter of 1.7 mm. Ratio1 may then be:

$$\text{Ratio1} = d_{ES} : d_{FOID}$$

$$\text{Ratio1} = 4.0 \text{ mm}/1.7 \text{ mm}$$

$$\text{Ratio1} = 2.4$$

In the depicted example, Ratio2 may be defined as:

$$\text{Ratio2} = d_{ES} : d_{FOORD}$$

Ratio2 may be about 1.0, 1.1, 1.2, 1.3, 1.4, 1.5, 1.6, 1.7, 1.8, 1.9 or about 2.0 or more. In an illustrative example, the rubber sealing surface, such as elastic stopper 915, may have a diameter of 4.0 mm. The elastic stopper 915 may seal against a metal valve seat with a front orifice outer rim diameter of 2.3 mm. Ratio2 may then be:

$$\text{Ratio2} = d_{ES} : d_{FOORD}$$

$$\text{Ratio2} = 4.0 \text{ mm}/2.3 \text{ mm}$$

$$\text{Ratio2} = 1.7$$

When the plunger 910 is pulled away from the front orifice 925, which may occur when the solenoid valve 900 is activated, a distance is h is defined as the pull-off distance. Further, a pull-off area is defined as $A_{PO} = h \cdot d_{ES}$.

The front orifice 925 includes a cross sectional area of the front orifice 925. This may be the area of the face of the front orifice 925 and may be defined as $A_{FO} = \pi \cdot (d_{FOID}/2)^2$ In the depicted example, Ratio3 may be defined as:

$$\text{Ratio3} = A_{FO} : A_{PO}$$

Ratio3 may be about 0.5, 0.6, 0.7, 0.8, 0.9, 1.0, 1.1, 1.2, 1.3, 1.4 or about 1.5 or more. In an illustrative example, the rubber sealing surface, such as elastic stopper 915, may have a diameter of 4.0 mm. The elastic stopper 915 may seal against a metal valve seat with a front orifice inner diameter of 1.7 mm. The elastic stopper 915 may pull off the metal valve seat by a distance h of about 0.6 mm. Ratio3 may then be:

$$\text{Ratio3} = A_{FO} : A_{PO}$$

$$\text{Ratio3} = \pi \cdot (d_{FOID}/2)^2 : d_{ES} \cdot h$$

$$\text{Ratio3} = 2.3 \text{ mm}^2 / 2.4 \text{ mm}^2$$

$$\text{Ratio3} = 0.96$$

FIG. 10 depicts a perspective tear-away view of an exemplary solenoid valve illustrating the flatness of a valve seat. A top portion of an exemplary solenoid valve 1000 includes a valve seat 1005. The valve seat 1005 receives an elastic stopper, such as the elastic stopper 825 in FIG. 8. The elastic stopper is configured to seal around the valve seat 1005 to block fluid flow from a top orifice 1010. The valve seat 1005 may be molded into a solenoid valve main body 1015.

In some embodiments, the valve seat 1005 may be machined steel. The machined steel valve seat 1005 may be held to tighter tolerances than injection molded plastic. Accordingly, the machined steel valve seat 1005 may be held to a flatness specification, which may advantageously improve the seal to the elastic stopper. Further, the machined steel valve seat 1005 may be machined to a substantially precise flatness and smoothness.

Figure 11:
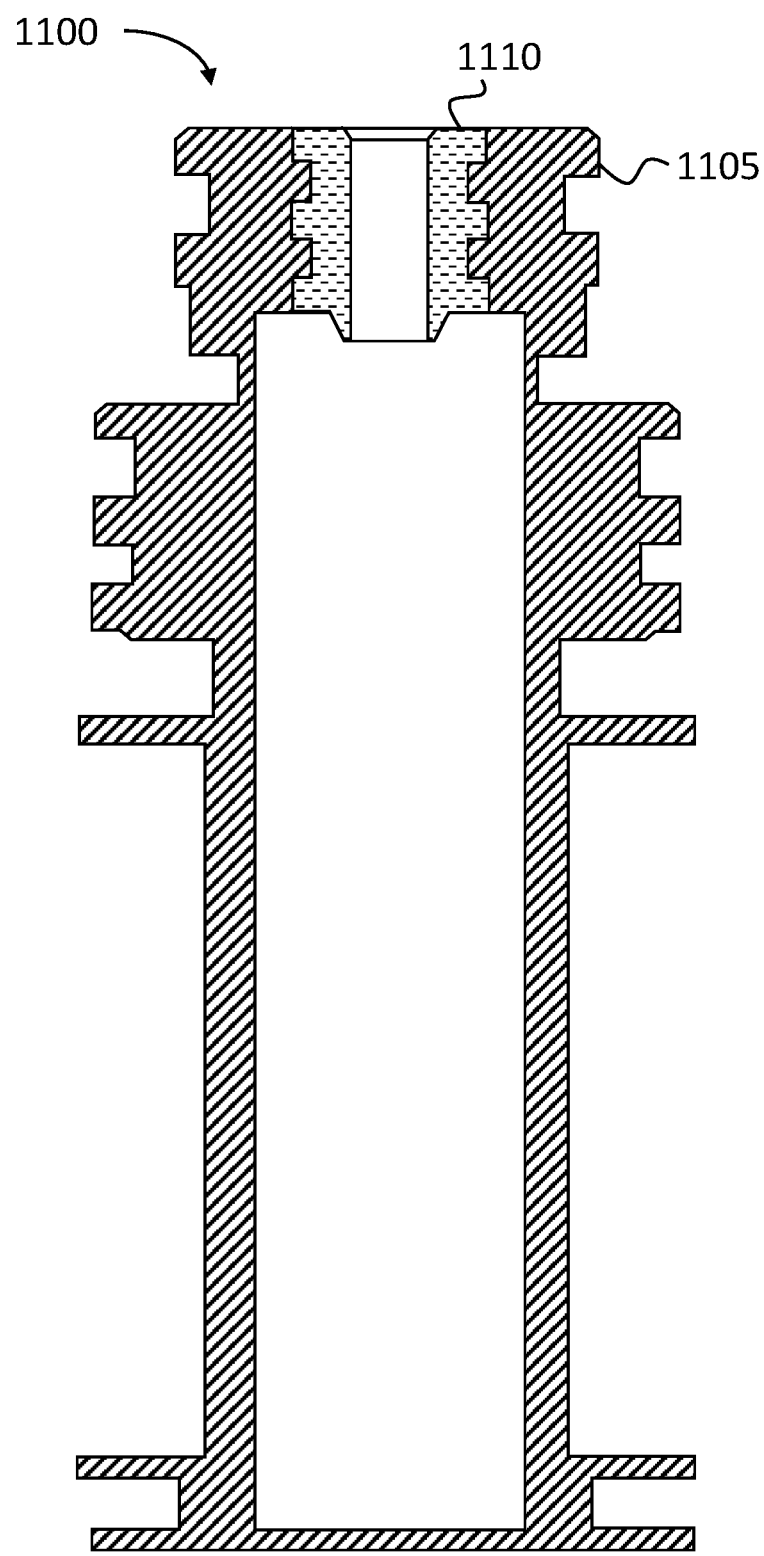
FIG. 11 depicts a cross-sectional view of an exemplary molded-in valve seat.

FIG. 11 depicts a molded-in valve seat. A valve body 1100 includes a valve bobbin 1105. The valve bobbin 1105 may be formed of a molding material (e.g., thermoplastic, Liquid Crystal Polymer (LCP)) during a molding process. The valve bobbin 1105 is integrally coupled to a molded-in valve seat 1110. In some examples, the molded-in valve seat 1110 may include metal. The molded-in valve seat 1110 may be surrounded or substantially surrounded by the molding material during the molding process. In various implementations, the molded-in valve seat 1110 may be held to a flatness specification, which may advantageously improve a seal to an elastic stopper, such as top elastic stopper 725 in FIG. 7.

Although various embodiments have been described with reference to the figures, other embodiments are possible. For example, various valve parts may include Liquid Crystal Polymer (LCP). LCP may advantageously provide heat resistance and warp resistance. In some examples, the LCP may be molded at high speed and may replicate mold feature details. In various implementations, the LCP may be molded substantially smooth and flat, which may advantageously provide an effective sealing surface between an elastic stopper and a valve seat.

Various valve assembly processes may include sorting based on performance. For example, a manufacturing process may include measurement of various coil properties of solenoid valves. The solenoid valves may be matched with various split collars to produce a desired performance. The various split collars may be placed on the solenoid valves with various gaps between the split collars. The various split collars may include various thicknesses and mating shims. The various split collars may include various inner diameters and various outer diameters. Further, the various split collars may be placed on the solenoid valve in various positions.

In some embodiments, the various magnetically permeable split collars and magnetically permeable rings may include one or more materials. For example, the various magnetically permeable split collars and magnetically permeable rings may include a mixture of ferromagnetic materials and various polymers.

In an exemplary aspect, a solenoid valve system may include a longitudinally extending bobbin (e.g., bobbin 120 depicted FIG. 1) having a longitudinal axis A, a body portion 120A, and a neck portion 120B. The bobbin may include a longitudinally extending inner chamber, a bobbin longitudinal proximal end, and a bobbin longitudinal distal end. The system may include a first valve seat proximate to the bobbin longitudinal distal end. The first valve seat may include a first valve aperture. The system may include a plunger in the inner chamber. The plunger including a plunger longitudinal proximal end and a plunger longitudinal distal end. The system may include a biasing component configured to bias the plunger toward a first longitudinal position. The system may include a solenoid enclosing at least a portion of the bobbin. The solenoid may have a solenoid axis parallel to the longitudinal axis of the bobbin. The solenoid may be configured to selectively actuate longitudinal movement of the plunger. The system may include a split collar around the neck portion of the bobbin. The split collar may have a collar axis parallel to the longitudinal axis of the bobbin. The split collar may include an annular ring formed of at least two complementary collar sections. The complementary collar sections may include a first semicircle and a second semicircle. In some examples, the split collar may have a magnetic permeability gradient that may change from a proximal end of the ring to a distal end of the ring. In some embodiments, in response to energizing the solenoid, the split collar may focus a magnetic field generated by the solenoid to couple the magnetic field generated by the solenoid with a magnetically permeable portion of the plunger. In a first mode, the first valve aperture may be blocked by the plunger longitudinal distal end. In a second mode, the first valve aperture may not be blocked by the plunger longitudinal distal end.

In some examples, the first mode may correspond to the first longitudinal position of the plunger. Accordingly, the second mode may correspond to a second longitudinal position of the plunger. In various embodiments, the system may include a flow port at the longitudinal distal end of the bobbin. In the first mode, the plunger longitudinal distal end may inhibit fluid communication between the first valve aperture and the flow port via the inner chamber. In the second mode, the first valve aperture and the flow port may be in fluid communication with one another via the inner chamber. In some embodiments, the biasing component may be a spring.

In some embodiments, the first valve seat may include a flat, circularly-shaped surface. The system may include a distal elastic stopper at the plunger longitudinal distal end. The distal elastic stopper may sealingly engage with the first valve seat in the first mode. In various examples, the system may include a proximal fitting in the inner chamber. The proximal fitting may include a second valve seat. In the first mode, the plunger longitudinal proximal end may be disengaged from the second valve seat. In the second mode, the plunger longitudinal proximal end may be sealingly engaged with the second valve seat.

In some examples, the proximal fitting includes a longitudinally extending orifice. In the first mode, the orifice and the flow port are in fluid communication with one another via the inner chamber. In the second mode, the plunger longitudinal proximal end blocks the orifice, mitigating fluid communication between the orifice and the flow port. In some examples, the solenoid valve apparatus may act as a three-way valve. In various implementations, the solenoid valve system may include longitudinally extending channels on an outer surface of the plunger. The longitudinally extending channels may facilitate fluid communication between the orifice and the flow port in the first mode. Some examples may include a proximal elastic stopper at the plunger longitudinal proximal end. The proximal elastic stopper may sealingly engage with the second valve seat in the second mode.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A solenoid valve apparatus comprising:
   a longitudinally extending bobbin having a longitudinal axis, a body portion, and a neck portion, the bobbin comprising:
     a longitudinally extending inner chamber,
     a bobbin longitudinal proximal end,
     a bobbin longitudinal distal end, and,
     a plurality of distinct receptacles each spaced longitudinally apart from one another along the neck portion of the bobbin;
   a first valve seat disposed proximate to the bobbin longitudinal distal end, the first valve seat comprising a first valve aperture;
   a plunger disposed in the inner chamber, the plunger comprising a plunger longitudinal proximal end and a plunger longitudinal distal end;
   a biasing component configured to bias the plunger toward a first longitudinal position;
   a solenoid enclosing at least a portion of the bobbin, the solenoid having a solenoid axis parallel to the longitudinal axis of the bobbin, wherein the solenoid is configured to selectively actuate longitudinal movement of the plunger; and,
   a split collar disposed around the neck portion of the bobbin, the split collar having a collar axis parallel to the longitudinal axis of the bobbin, wherein the split collar comprises an annular ring formed of at least two complementary collar sections comprising a first semicircle and a second semicircle,
   wherein in response to energizing the solenoid, the split collar focuses a magnetic field generated by the solenoid to couple the magnetic field generated by the solenoid with a magnetically permeable portion of the plunger,
   wherein in a first mode, the first valve aperture is blocked by the plunger longitudinal distal end, and in a second mode, the first valve aperture is not blocked by the plunger longitudinal distal end,
   wherein each of the plurality of distinct receptacles is configured to receive at least a portion of the split collar,
   wherein a magnetic flux profile associated with the solenoid valve apparatus is adjustable by selectively receiving the portion of the split collar in one of the plurality of distinct receptacles to set a fixed axial placement of the split collar along the longitudinal axis, such that the solenoid valve apparatus is configurable to generate a plurality of different and distinct magnetic field distributions as determined by the fixed axial placement of the split collar along the longitudinal axis.

2. The solenoid valve apparatus of claim 1, further comprising a flow port disposed at the longitudinal distal end of the bobbin, wherein in the first mode, the plunger longitudinal distal end inhibits fluid communication between the first valve aperture and the flow port via the inner chamber, and in the second mode, the first valve aperture and the flow port are in fluid communication with one another via the inner chamber.

3. The solenoid valve apparatus of claim 2, further comprising a proximal fitting disposed in the inner chamber, the proximal fitting comprising a second valve seat, wherein in the first mode, the plunger longitudinal proximal end is disengaged from the second valve seat, and in the second mode, the plunger longitudinal proximal end is sealingly engaged with the second valve seat.

4. The solenoid valve apparatus of claim 3, wherein the proximal fitting further comprises a longitudinally extending orifice, wherein in the first mode, the orifice and the flow port are in fluid communication with one another via the inner chamber, and in the second mode, the plunger longitudinal proximal end blocks the orifice preventing fluid communication between the orifice and the flow port, such that the solenoid valve apparatus acts as a three-way valve.

5. The solenoid valve apparatus of claim 4, further comprising longitudinally extending channels on an outer surface of the plunger for facilitating fluid communication between the orifice and the flow port in the first mode.

6. The solenoid valve apparatus of claim 4, further comprising a proximal elastic stopper disposed at the plunger longitudinal proximal end, wherein the proximal elastic stopper sealingly engages with the second valve seat in the second mode.

7. The solenoid valve apparatus of claim 1, wherein the split collar has a magnetic permeability gradient that changes from a proximal end of the ring to a distal end of the ring.

8. The solenoid valve apparatus of claim 1, wherein the first valve seat comprises a molded-in valve seat.

9. The solenoid valve apparatus of claim 1, further comprising a distal elastic stopper disposed at the plunger longitudinal distal end, wherein the distal elastic stopper sealingly engages with the first valve seat in the first mode.

10. The solenoid valve apparatus of claim 1, wherein the biasing component is a spring.

11. The solenoid valve apparatus of claim 1, wherein the first mode corresponds to the first longitudinal position of the plunger, and the second mode corresponds to a second longitudinal position of the plunger.

12. A solenoid valve apparatus comprising:
a longitudinally extending bobbin having a longitudinal axis, a body portion, and a neck portion, the bobbin comprising:
  a longitudinally extending inner chamber,
  a bobbin longitudinal proximal end,
  a bobbin longitudinal distal end, and,
  a plurality of distinct receptacles each spaced longitudinally apart from one another along the neck portion of the bobbin;
a first valve seat disposed proximate to the bobbin longitudinal distal end, the first valve seat comprising a first valve aperture;
a plunger disposed in the inner chamber, the plunger comprising a plunger longitudinal proximal end and a plunger longitudinal distal end;
a biasing component configured to bias the plunger toward a first longitudinal position;
a solenoid enclosing at least a portion of the bobbin, the solenoid having a solenoid axis parallel to the longitudinal axis of the bobbin, wherein the solenoid is configured to selectively actuate longitudinal movement of the plunger; and,
a split collar disposed around the neck portion of the bobbin, the split collar having a collar axis parallel to the longitudinal axis of the bobbin, wherein the split collar comprises at least two complementary collar sections,
wherein in response to energizing the solenoid, the split collar focuses a magnetic field generated by the solenoid to couple the magnetic field generated by the solenoid with a magnetically permeable portion of the plunger,
wherein each of the plurality of distinct receptacles is configured to receive at least a portion of the split collar,
wherein a magnetic flux profile associated with the solenoid valve apparatus is adjustable by selectively receiving the portion of the split collar in one of the plurality of distinct receptacles to set a fixed axial placement of the split collar along the longitudinal axis, such that such that the solenoid valve apparatus is configurable to generate a plurality of different and distinct magnetic field distributions as determined by the fixed axial placement of the split collar along the longitudinal axis.

13. The solenoid valve apparatus of claim 12, further comprising a flow port disposed at the longitudinal distal end of the bobbin, wherein in a first mode, the plunger longitudinal distal end inhibits fluid communication between the first valve aperture and the flow port via the inner chamber, and in a second mode, the first valve aperture and the flow port are in fluid communication with one another via the inner chamber.

14. The solenoid valve apparatus of claim 13, further comprising a proximal fitting disposed in the inner chamber, the proximal fitting comprising a second valve seat, wherein in a first mode, the plunger longitudinal proximal end is disengaged from the second valve seat, and in a second mode, the plunger longitudinal proximal end is sealingly engaged with the second valve seat.

15. The solenoid valve apparatus of claim 14, wherein the proximal fitting further comprises a longitudinally extending orifice, wherein in the first mode, the orifice and the flow port are in fluid communication with one another via the inner chamber, and in the second mode, the plunger longitudinal proximal end blocks the orifice preventing fluid communication between the orifice and the flow port, such that the solenoid valve apparatus acts as a three-way valve.

16. The solenoid valve apparatus of claim 12, wherein the split collar has a magnetic permeability gradient that changes from a proximal end of the split collar to a distal end of the split collar.

17. The solenoid valve apparatus of claim 12, wherein the first valve seat comprises a molded-in valve seat.

18. The solenoid valve apparatus of claim 12, wherein in a first mode, the first valve aperture is blocked by the plunger longitudinal distal end, and in a second mode, the first valve aperture is not blocked by the plunger longitudinal distal end, and wherein the first mode corresponds to the first longitudinal position of the plunger, and second mode corresponds to a second longitudinal position of the plunger.

19. A solenoid valve apparatus comprising:
a longitudinally extending bobbin having a longitudinal axis, a body portion, and a neck portion, the bobbin comprising:
  a longitudinally extending inner chamber,
  a bobbin longitudinal proximal end,
  a bobbin longitudinal distal end, and,
  a plurality of distinct receptacles each spaced longitudinally apart from one another along the neck portion of the bobbin;
a first valve seat disposed proximate to the bobbin longitudinal distal end, the first valve seat comprising a first valve aperture;
a plunger disposed in the inner chamber, the plunger comprising a plunger longitudinal proximal end and a plunger longitudinal distal end;
a biasing component configured to bias the plunger toward a first longitudinal position;

a solenoid enclosing at least a portion of the bobbin, the solenoid having a solenoid axis parallel to the longitudinal axis of the bobbin, wherein the solenoid is configured to selectively actuate longitudinal movement of the plunger;

a means for focusing a magnetic field generated by the solenoid in response to energizing the solenoid to couple the magnetic field generated by the solenoid with a magnetically permeable portion of the plunger, the means for focusing being disposed at the neck portion of the bobbin; and, at least one shim configured to be placed on a side of the means for focusing a magnetic field generated by the solenoid, wherein in a first mode, the first valve aperture is blocked by the plunger longitudinal distal end, and in a second mode, the first valve aperture is not blocked by the plunger longitudinal distal end, wherein each of the plurality of distinct receptacles is configured to receive at least a portion of the means for focusing a magnetic field generated by the solenoid, wherein a magnetic flux profile associated with the solenoid valve apparatus is adjustable by: (1) selectively receiving the means for focusing a magnetic field generated by the solenoid in one of the plurality of distinct receptacles, and (2) selectively placing the at least one shim adjacent to the means for focusing a magnetic field generated by the solenoid, to set a fixed axial placement of the means for focusing a magnetic field generated by the solenoid along the longitudinal axis, such that such that the solenoid valve apparatus is configurable to generate a plurality of different and distinct magnetic field distributions as determined by the fixed axial placement of the means for focusing a magnetic field generated by the solenoid along the longitudinal axis.

20. The solenoid valve apparatus of claim 19, wherein the first mode corresponds to the first longitudinal position of the plunger, and the second mode corresponds to a second longitudinal position of the plunger.

* * * * *